US008508671B2

(12) United States Patent
Slack et al.

(10) Patent No.: US 8,508,671 B2
(45) Date of Patent: Aug. 13, 2013

(54) PROJECTION SYSTEMS AND METHODS

(75) Inventors: Brandon Dean Slack, Campbell, CA (US); David Robbins Falkenburg, San Jose, CA (US); Reese T. Cutler, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1295 days.

(21) Appl. No.: 12/206,546

(22) Filed: Sep. 8, 2008

(65) Prior Publication Data
US 2010/0060803 A1 Mar. 11, 2010

(51) Int. Cl.
*H04N 5/64* (2006.01)
*H04N 9/31* (2006.01)
*H04N 3/22* (2006.01)
*H04N 3/26* (2006.01)
*G03B 21/00* (2006.01)

(52) U.S. Cl.
USPC ........... 348/744; 348/745; 348/383; 353/122; 353/121

(58) Field of Classification Search
USPC ................ 348/744, 189, 14.08, 14.12, 180, 348/191, 746, 747, 745, 807, 806; 353/69
See application file for complete search history.

(56) References Cited

U.S. PATENT DOCUMENTS

| | | | |
|---|---|---|---|
| 3,363,104 A | 1/1968 | Waite et al. | |
| 3,761,947 A | 9/1973 | Volkmann et al. | |
| 4,620,222 A | 10/1986 | Baba et al. | |
| 5,272,473 A | 12/1993 | Thompson et al. | |
| 5,274,494 A | 12/1993 | Rafanelli et al. | |
| 5,337,081 A | 8/1994 | Kamiya et al. | |
| 6,282,655 B1 | 8/2001 | Given | |
| 6,310,662 B1 | 10/2001 | Sunakawa et al. | |
| 6,339,429 B1 | 1/2002 | Schug | |
| 6,456,339 B1 * | 9/2002 | Surati et al. | 348/745 |
| 6,516,151 B2 * | 2/2003 | Pilu | 396/106 |
| 6,525,772 B2 * | 2/2003 | Johnson et al. | 348/383 |
| 6,560,711 B1 | 5/2003 | Given et al. | |
| 6,561,654 B2 | 5/2003 | Mukawa et al. | |
| 6,618,076 B1 * | 9/2003 | Sukthankar et al. | 348/180 |
| 6,636,292 B2 | 10/2003 | Roddy et al. | |
| 6,807,010 B2 | 10/2004 | Kowarz | |
| 6,862,022 B2 | 3/2005 | Slupe | |
| 6,877,863 B2 | 4/2005 | Wood et al. | |
| 6,924,909 B2 | 8/2005 | Lee et al. | |
| 6,930,669 B2 | 8/2005 | Weiner et al. | |
| 6,970,080 B1 | 11/2005 | Crouch et al. | |

(Continued)

FOREIGN PATENT DOCUMENTS

| | | |
|---|---|---|
| EP | 167314 | 1/1986 |
| EP | 2053844 | 4/2009 |
| WO | WO2009/001512 | 12/2008 |

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Jefferey Harold
*Assistant Examiner* — Sean Haiem
(74) *Attorney, Agent, or Firm* — Dorsey & Whitney LLP

(57) ABSTRACT

Projection systems and methods may provide improved remote capabilities and interaction with client devices. Further, systems and methods may provide for calibration of a projection system, in particular using an auxiliary device. Further, methods may provide control of audio associated with presentation data, in particular at client devices.

32 Claims, 9 Drawing Sheets

(56) References Cited

U.S. PATENT DOCUMENTS

| | | | |
|---|---|---|---|
| 7,028,269 | B1 | 4/2006 | Cohen-Solal et al. |
| 7,058,234 | B2 | 6/2006 | Gindele et al. |
| 7,079,707 | B2 | 7/2006 | Baron |
| 7,307,709 | B2 | 12/2007 | Lin et al. |
| 7,352,913 | B2 | 4/2008 | Karuta et al. |
| 7,413,311 | B2 | 8/2008 | Govorkov et al. |
| 7,590,335 | B2 | 9/2009 | Kobayashi et al. |
| 7,598,980 | B2 | 10/2009 | Imai et al. |
| 7,613,389 | B2 | 11/2009 | Suzuki et al. |
| 7,629,897 | B2 | 12/2009 | Koljonen |
| 7,641,348 | B2 | 1/2010 | Yin et al. |
| 7,653,304 | B2 | 1/2010 | Nozaki et al. |
| 7,658,498 | B2 | 2/2010 | Anson |
| 7,834,846 | B1 | 11/2010 | Bell |
| 7,869,204 | B2 | 1/2011 | Bair et al. |
| 2002/0021288 | A1 | 2/2002 | Schug |
| 2003/0038927 | A1 | 2/2003 | Alden |
| 2003/0117343 | A1 | 6/2003 | King |
| 2004/0193413 | A1 | 9/2004 | Wilson et al. |
| 2005/0001991 | A1* | 1/2005 | Ulichney et al. ............... 353/69 |
| 2005/0060432 | A1* | 3/2005 | Husain et al. ................. 709/246 |
| 2005/0132408 | A1* | 6/2005 | Dahley et al. .................. 725/80 |
| 2005/0168583 | A1 | 8/2005 | Thomason |
| 2005/0182962 | A1 | 8/2005 | Given et al. |
| 2005/0280786 | A1 | 12/2005 | Moiroux et al. |
| 2006/0140452 | A1 | 6/2006 | Raynor et al. |
| 2006/0197843 | A1 | 9/2006 | Yoshimatsu |
| 2006/0244742 | A1* | 11/2006 | Nakamura et al. ........... 345/204 |
| 2007/0027580 | A1 | 2/2007 | Ligtenberg et al. |
| 2007/0157259 | A1* | 7/2007 | Koplar et al. .................. 725/81 |
| 2007/0177279 | A1 | 8/2007 | Cho et al. |
| 2007/0236485 | A1 | 10/2007 | Trepte |
| 2007/0300312 | A1 | 12/2007 | Chitsaz et al. |
| 2008/0062164 | A1 | 3/2008 | Bassi et al. |
| 2008/0131107 | A1 | 6/2008 | Ueno |
| 2008/0158362 | A1 | 7/2008 | Butterworth |
| 2009/0027337 | A1 | 1/2009 | Hildreth |
| 2009/0051797 | A1 | 2/2009 | Yao |
| 2009/0221368 | A1 | 9/2009 | Yen et al. |
| 2009/0262306 | A1 | 10/2009 | Quinn et al. |
| 2009/0262343 | A1 | 10/2009 | Archibald |
| 2009/0273679 | A1 | 11/2009 | Gere et al. |
| 2010/0061659 | A1 | 3/2010 | Slack et al. |
| 2010/0073499 | A1 | 3/2010 | Gere et al. |
| 2010/0079426 | A1 | 4/2010 | Pance et al. |
| 2010/0079468 | A1 | 4/2010 | Pance et al. |
| 2010/0079653 | A1 | 4/2010 | Pance |
| 2010/0079884 | A1 | 4/2010 | Gere et al. |
| 2010/0083188 | A1 | 4/2010 | Pance et al. |
| 2010/0103172 | A1 | 4/2010 | Purdy |
| 2011/0074931 | A1 | 3/2011 | Bilbrey et al. |
| 2011/0075055 | A1 | 3/2011 | Bilbrey |
| 2011/0115964 | A1 | 5/2011 | Gere |
| 2011/0149094 | A1 | 6/2011 | Chen et al. |

OTHER PUBLICATIONS

Sokolova et al., "Experiments in Stereo Vision," Computer Science 570, Final Project, http://disparity.wikidot.com/, 14 pages, at least as early as Jun. 16, 2010.

* cited by examiner

PROJECTION SYSTEMS AND METHODS

CROSS-REFERENCE TO RELATED APPLICATIONS

This application is related to copending patent application Ser. No. 12/206,554, entitled "Method and Apparatus for Depth Sensing Keystoning", and filed on Sep. 8, 2008, the entire disclosure of which is incorporated herein by reference.

TECHNICAL FIELD

This invention relates generally to projection systems and methods, and more specifically to methods and apparatus for remote interaction with projector systems.

BACKGROUND

Projector systems are often used to make presentations to audiences, such as at business meetings. Such systems may be adapted to project a presentation, such as a slide show, on a screen, wall or other surface. The presentation may be stored on a computer, such as a laptop, which may be coupled to the projector system. The display of the presentation by the projector system may be controlled by the computer or a peripheral device thereof, such as a mouse.

Such conventional projector systems are local to the presentation, for example, typically located in the same room as the source of the presentation data, such as the computer. While video conferencing equipment may also be present and make it possible to view the presentation remotely, interaction and viewing is limited to the video conferencing equipment.

SUMMARY

Various embodiments described herein are directed to projection systems and methods that provide improved remote capabilities and interaction. Various embodiments involve a projector system comprising a projector, a camera, a processor and a communication interface.

Various embodiments contemplate a method for calibrating a projection system. The method may include: projecting an image using the projection system; obtaining sensor data of the projected image using an auxiliary device; transmitting the sensor data from the auxiliary device to the projection system; and calibrating the projection system based at least in part on the sensor data from the auxiliary device.

Various embodiments contemplate a system for calibrating a projection system. The system may include: a projection system configured to project an image; and an auxiliary device configured to obtaining sensor data of the image projected by the projection system and to transmit the sensor data to the projection system; wherein the projection system is configured to calibrate based at least in part on the sensor data received from the auxiliary device.

Various embodiments contemplate a projection system. The projection system may include: a projector configured to project an image based on presentation data; and at least one sensor configured to capture sensor data of the image projected by the projector; wherein the projection system is configured to transmit the presentation data and the sensor data to at least one remote client device.

Various embodiments contemplate a projection method. The projection method may include: projecting an image based on presentation data using a projector; capturing sensor data of the image projected by the projector using at least one sensor; transmitting the presentation data to at least one remote client device; and transmitting the sensor data to at least one remote client device.

Other embodiments of a projection method may include: receiving presentation data from a remote client device; receiving sensor data from a remote client device; and projecting an image using a projector based on the presentation data and the sensor data.

Various embodiments contemplate a method for controlling audio associated with presentation data. The method may include: transmitting presentation data and audio data associated with the presentation data from a projection system at a location to at least one client device; generating audible output of the audio data associated with the presentation data from the projection system at the location; and controlling output of the audio data associated with the presentation data by the at least one client device based on a location of the client device relative to the location of the projection system.

Various embodiments contemplate a computer readable storage medium including stored instructions that, when executed by a computer, cause the computer to perform any of the various methods described herein and/or any of the functions of the systems disclosed herein.

These and other embodiments and features will be apparent to those of ordinary skill in the art upon reading this disclosure in its entirety, along with the appended claims.

DETAILED DESCRIPTION OF THE INVENTION

Figure 1:
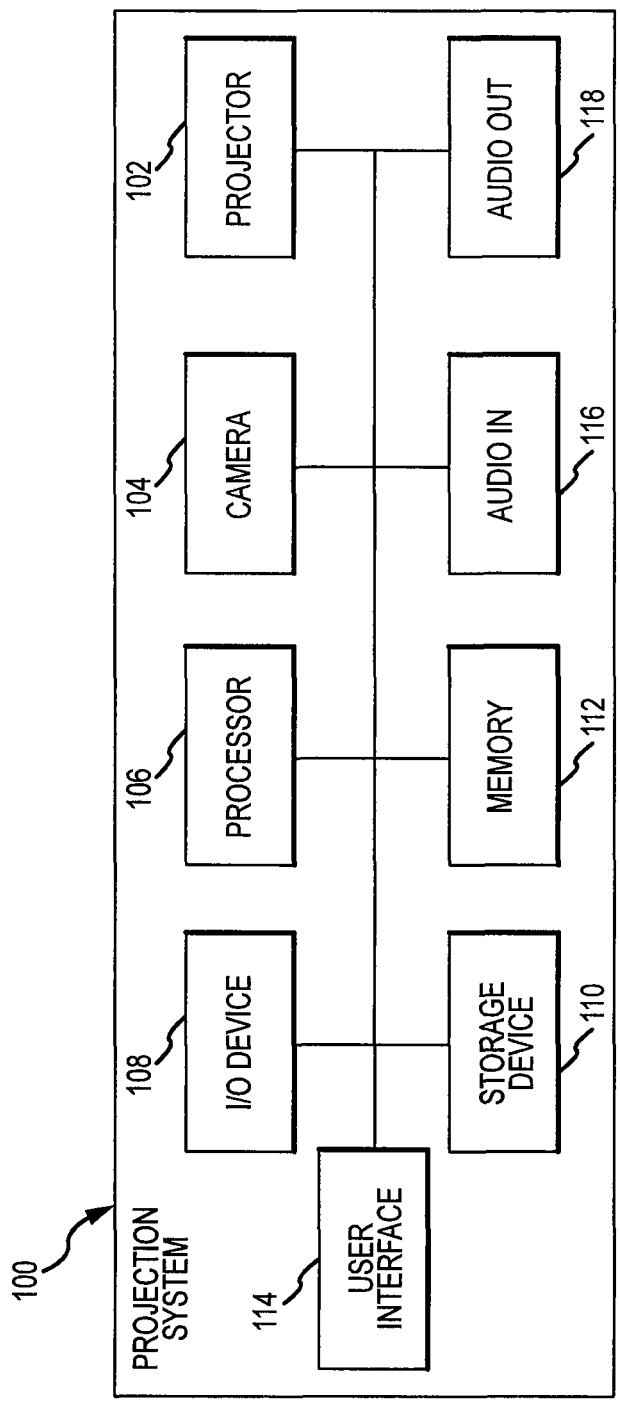
FIG. 1 is a block diagram illustrating an example of a projection system.

Projection systems and methods described herein may provide improved remote capabilities and interaction. The systems may involve a projection system comprising a projector, a camera, a processor and a communication interface. The projector may be configured to display a presentation by projecting presentation data onto a surface, such as a screen or a wall, and the camera may be configured to obtain camera data by capturing an image of the presentation as projected. The communication interface may be configured to allow the projection system to transmit both the presentation data and the camera data to one or more client devices, either directly or via a network, such as the Internet, so that the presentation data and the camera data may be viewed remotely using client devices. In this context, remotely is intended to mean at a distance from the projection system and outside visual range and line of sight of the image projected by the projector of the projection system.

The communication interface may be wired to the network, such as via an Ethernet cable. However, the communication interface may also be wireless to communicate directly with client devices or indirectly via the network. Further, the communication interface may be configured to receive data from client devices. For example, a client device may transmit presentation data to the projection system to be displayed via the projector. The client device may also transmit camera data and/or client input to the projection system to be displayed with the presentation data, for example, by overlaying the presentation data with the camera data and/or client input.

The camera data captured by the camera of the projection system may include various visual cues occurring during the presentation, such as a presenter, a pointer or other artifact within the field of view of the camera that goes along with the presentation. Thus, the camera data transmitted to client devices from the projection system may show the presentation as seen from the locality of the projection system.

The projection system may include an audio input, such as a microphone, to receive audio data, such as the voice of the presenter and/or voices of audience members viewing the presentation locally, that is, at the projection system. The audio input may be configured to provide the audio data to the communication interface for transmission to the client device(s), for example, together with the presentation data and/or with the camera data.

The audio input may also be configured to provide the audio data to an audio output, such as loudspeakers, of the projection system, for example, to amplify or broadcast the audio data to the audience members viewing the presentation locally and/or the speaker. Client input received from client devices may be in the form of audio data, such as comments or questions from audience members viewing the presentation remotely. Such client input may also be provided to the audio output of the projection system so that the audience members viewing the presentation locally and/or the speaker may hear such client input.

Thus, various embodiments contemplate a method for controlling audio associated with presentation data. The method may include: transmitting presentation data and audio data associated with the presentation data from a projection system at a location to at least one client device; generating audible output of the audio data associated with the presentation data from the projector system at the location; and controlling output of the audio data associated with the presentation data by the at least one client device based on a location of the client device relative to the location of the projection system.

The controlling of the output of the audio data associated with the presentation data by the client device may be performed at least in part by the client device. For example, the audible output of the audio data by the projector system may be detected at the client device, for example, using a microphone of the client device. The output of the audio data may be disabled by the client device when the audible output of the audio data by the projector system is detected. Alternatively or additionally, monitoring for the audible output of the audio data by the projector system may be performed at the client device. The output of the audio data by the client device may be enabled when the audible output of the audio data by the projector system is not detected.

The controlling the output of the audio data associated with the presentation data by the client device may be performed at least in part by the projector system. A number of hops required for data transmission from the projector system to the client device may be determined. The output of the audio data by the client device may be enabled or disabled based on the determined number of hops. Alternatively or additionally, a router used for data transmission from the projector system to the client device may be determined, and the output of the audio data by the client device may be enabled or disabled based on the determined router.

As will be further understood from the description herein, the projection system may thus provide users of client devices with improved remote capabilities and interaction. Each user may select between viewing the camera data to see the presentation, the presenter and any other visual cues going along with the presentation, and viewing the presentation data, which may provide greater resolution than the camera data, for example, by providing raw data to the client device. Further, each user may be allowed to participate with the presentation by providing client input to the projection system. As discussed above, the client input may be in the form of audio data such as comments or questions. The client data may also be in the form of visual data, such as a pointer, highlighting or other visual cue input at the client device. The visual data may be projected by the projector of the projection system along with the presentation data, for example, such that the visual data is overlaid on the presentation data being projected.

In the case where a remote presenter uses a client device to provide the presentation data to the projection system to be displayed and/or transmitted to other client devices, the client device may also transmit camera data and/or client input to the projection system to be displayed with the presentation data, as mentioned above. The camera data and/or client input may be combined with the presentation data, for example, by overlaying the presentation data with the camera data and/or client input, either at the client device or at the projection system, depending on available resources, such as processing capability.

Further, the client device being used to make the presentation may be configured to synchronously display both the presentation data and the client camera data and/or client input so that the remote presenter is able to view his interaction with the presentation data as the presentation is projected by the projection system. Alternatively, the client device may be configured to receive and display the camera data from the projection system so that the remote presenter is able to view the actual presentation as it is projected by the projection system. In either case, such display may provide feedback to the remote presenter to facilitate his interaction with the presentation data.

Thus, various embodiments contemplate a projection system. The projection system may include: a projector configured to project an image based on presentation data; and at least one sensor configured to capture sensor data of the image projected by the projector; wherein the projection system is configured to transmit the presentation data and the sensor data to at least one remote client device.

The sensor may be a camera configured to capture the image projected by the projector as camera data. The projection system may thus be configured to transmit the presentation data and the camera data to at least one remote client device.

Similarly, various embodiments contemplate a projection method. The projection method may include: projecting an image based on presentation data using a projector; capturing sensor data of the image projected by the projector using at least one sensor; transmitting the presentation data to at least one remote client device; and transmitting the sensor data to at least one remote client device.

In particular, capturing sensor data may include capturing an image of the image projected by the projector as camera data. Thus, transmitting the sensor data may include transmitting the camera data to at least one remote client device.

Further, a projection method may include: receiving presentation data from a remote client device; receiving sensor data from a remote client device; and projecting an image using a projector based on the presentation data and the sensor data. As discussed herein, the presentation data and the sensor data may be received from a same remote client device. The sensor data received may include various sensor data, including camera data and/or gesture data.

Projection systems and methods described herein may also provide auxiliary calibration capabilities. In this context, auxiliary calibration is intended to mean at a distance from the projection system, but within visual range and line of sight of the image projected by the projector of the projection system. Although the projection system may be calibrated, for example, by color correction, keystoning, and the like, via the processor of the projection system and images captured by the camera of the projection system and/or depth sensors, as described in the incorporated copending application Ser. No. 12/206,554, the projection system may be calibrated using an auxiliary device. That is, an auxiliary device, which may be a client device, may be used to obtain calibration data for the processor of the projection system to use to calibrate the projection system.

Auxiliary calibration may cause the processor to calibrate the projection system such that the image projected by the projector is calibrated to the point of view or perspective of the auxiliary device. In other words, by using an auxiliary device to obtain calibration data from a particular location, the projection system may be calibrated to provide a proper projected image as seen from that particular location.

The auxiliary device may include a camera to capture calibration data in the form of image data. The auxiliary device may be configured to initiate a calibration process by sending a calibration signal to the projection system. Upon receipt of the calibration signal, the projector of the projection system may project a calibration image or pattern onto a desired surface. The camera of the auxiliary device may capture image data by taking one or more pictures of the calibration image. The image data may be transmitted to the projection system and used by the processor to calibrate to the perspective of the auxiliary device. Additional pictures may be taken with the projector off, that is, not projecting the calibration image, for example to provide additional flexibility for color correction.

To account for the auxiliary device being off-axis or tilted, the auxiliary device may include an orientation detector, such as an accelerometer, configured to obtain orientation data. Other orientation detectors may also be employed, such as an inertial measurement unit (IMU), an attitude heading reference system (AHRS), or a gyroscope. As such it should be understood that any suitable orientation sensor may be used.

In particular, the orientation detector may determine orientation data for the orientation of the auxiliary device at the time each of the image data is captured by the camera of the auxiliary device. In other words, each time a picture is taken with the camera of the auxiliary device, the orientation detector may detect the orientation of the auxiliary device and associate the corresponding orientation data and image data for transmission to the projection system. Thus, the calibration data obtained by the auxiliary device may be in the form of one or more sets of orientation data and image data. Using the set(s) of orientation data and image data, the processor of the projection system may adjust, i.e., calibrate, the projection system so that the projector will project a desirable image as viewed from the location from which the calibration data was obtained.

The auxiliary device may be a remote control associated with the projection system and may be configured to control various functions of the projection system in addition to initiating the auxiliary calibration process. Alternatively, the auxiliary device may be any suitable device that includes a camera, and/or other sensor(s) as discussed herein, and is configured to communicate with the projection system, such as a client device as described herein.

Thus, various embodiments contemplate a method for calibrating a projection system. The method may include: projecting an image using the projection system; obtaining sensor data of the projected image using an auxiliary device; transmitting the sensor data from the auxiliary device to the projection system; and calibrating the projection system based at least in part on the sensor data from the auxiliary device.

The auxiliary device may be a dedicated device, such as a remote control, associated with the projection system. Alternatively or additionally, the auxiliary device may be a client device, that is, a device described herein as being able to communicate presentation data and/or other data with the presentation system, as long as the client device includes a suitable sensor for obtaining sensor data that may be used by the presentation system for calibration. Thus, it should be understood that the auxiliary device and/or the client devices discussed herein may be any suitable device, including, but not limited to, laptops, personal digital assistants (PDAs), cell phones, and the like.

The sensors that may be included in the auxiliary device and/or client devices may include, but are not limited to, image sensors (such as cameras, charge coupled devices (CCDs), and the like), color sensors, position sensors, depth sensors (such as infrared (IR), distance sensors (such as radio frequency), and orientation sensors (such as accelerometers, gyroscopes, and the like). Also, plural sensors may be used. In addition to plural sensors for sensing multiple types of data, plural sensors may be employed for a single type of data. For example, plural distance sensors may be employed to obtain distances from the auxiliary device to a plurality of points of the projected image.

The calibrating method may include obtaining sensor data of the projected image using the auxiliary device from a particular location, such that calibration of the projection system is such that the projection system is calibrated to project an image that is adjusted for the particular location.

Similarly, various embodiments contemplate a system for calibrating a projection system. The system may include: a projection system configured to project an image; and an auxiliary device configured to obtaining sensor data of the image projected by the projection system and to transmit the sensor data to the projection system; wherein the projection system is configured to calibrate based at least in part on the sensor data received from the auxiliary device.

Turning now to particular embodiments that provide examples of how projection systems and methods may be implemented, an example of a projection system 100 is illustrated in FIG. 1. It should be understood that details of the projection system 100 not specifically discussed herein may be implemented in any suitable manner, such as conventional and well known in the art.

The projection system 100 may include a projector 102, a camera 104, a processor 106 and a communication interface or input/output (I/O) device 108. The processor 106 may be configured to interact with and control operations of the projector 102, the camera 104 and the I/O device 108, as well as other elements of the projection system 100, for example, by executing software and/or algorithms stored in a storage device 110 and/or in a memory 112, as appropriate or desired. The processor 106 may respond to user input via a user interface 114 to control various functions. Alternatively or additionally, the user interface 114 may be configured to directly control various elements of the projection system 100, as appropriate or desired.

The I/O device 108 may comprise a wired interface or port and/or a wireless interface or card. As such, the I/O device 108 may be configured to transmit and receive data wirelessly or via a wired connection, as further discussed herein. In particular, the I/O device 108 may be configured to receive presentation data, which may be stored in the storage device 110 to be accessed later by the processor 106 and projected by the projector 102 for display on a surface, such as a screen, a wall, or the like. The presentation data may also be temporarily stored in the memory 112 as it is received and then projected by the projector 102, or may be fed directly to the projector 102, as appropriate or desired.

The I/O device 108 may be configured to receive presentation data locally or from a remote device, such as a client device as discussed herein. Additionally, the I/O device 108 may be configured to receive audio data from remote client devices, as well as client input data, as discussed herein. It should be understood that the I/O interface 108 may be implemented as one or more suitable devices depending, for example, on interface format, such as universal serial bus (USB).

The camera 104 may be configured to capture image data, particularly of the image projected by the projector 102, the screen and/or any visual cues such as the presenter, a pointer, etc. within the field of view of the camera 104. In other words, the camera 104 may be configured to capture image data corresponding to a calibration image or pattern projected by the projector, as discussed herein, for calibration of the projection system 100, and may be configured to capture image data corresponding to a presentation including the projected presentation data and any visual cues within the field of view of the camera 104 to be provided as camera data to remote devices, as discussed herein.

The projection system 100 may also include an audio input 116 and an audio output 118 to receive and broadcast audio data, respectively. For example, the audio input 116 may comprise a microphone and may be configured to receive audio data from the presenter and/or audience members at the location of the projection system 100. The audio output 118 may comprise a loudspeaker and may be configured to broadcast audio data received from the presenter and/or audience members at the location of the projection system 100, as well as any audio data that may be received from a presenter or audience members using client devices remote from the location of the projection system 100, as discussed herein.

Figure 2:
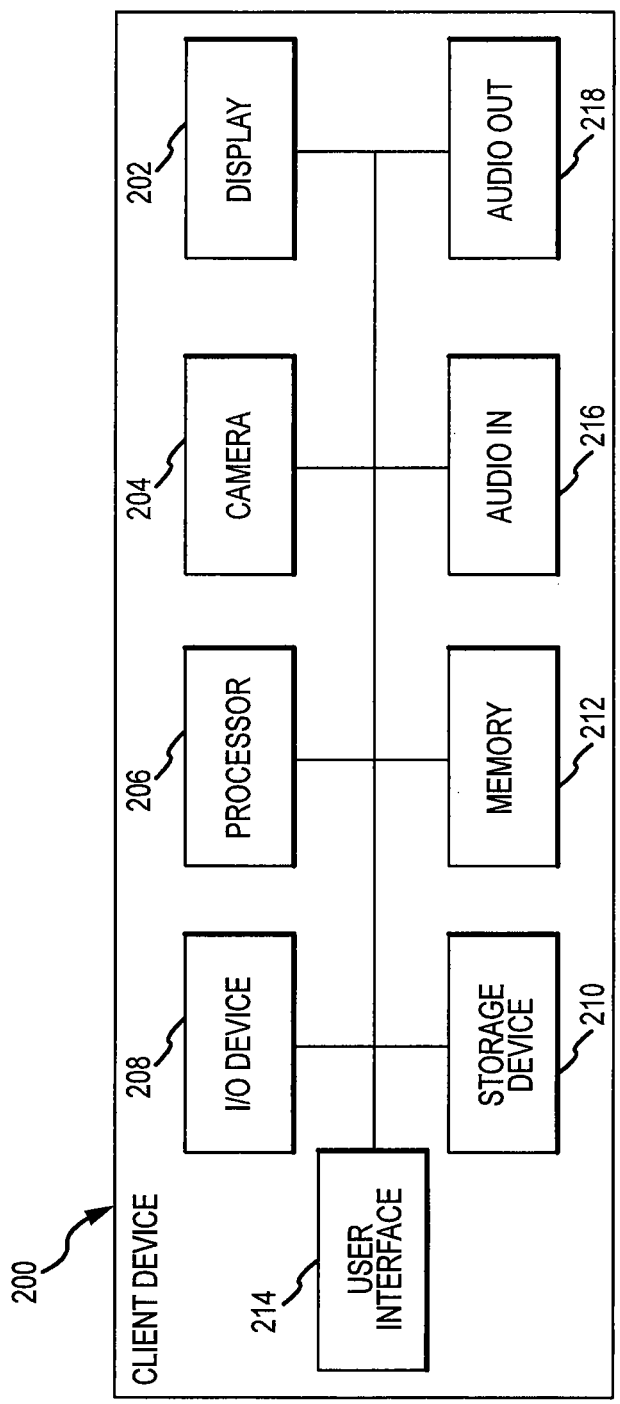
FIG. 2 is a block diagram illustrating an example of a client device that may be configured to cooperate with the projection system of FIG. 1.

An example of a client device 200 that may be used to interact with the projection system 100 of FIG. 1 is illustrated in FIG. 2. Again, it should be understood that details of the client device 200 not specifically discussed herein may be implemented in any suitable manner, such as conventional and well known in the art. The client device 200 may be, for example, a portable computer or laptop, a personal digital assistant (PDA), a cellular telephone, or other electronic device that is generally configured to be portable and used remotely.

The client device 200 may include a display 202, a camera 204, a processor 206 and a communication interface or input/output (I/O) device 208. It should be understood that the camera 204 may be optional for some implementations, for example, not involving auxiliary calibration or adding camera data to the presentation data. Further, it should be understood that the camera 204 represents only one type of sensor that may be included in the client device 200. As such, it should be understood that a different sensor, such as a position sensor, a depth sensor and/or an orientation sensor, may be provide in addition to, or in place of, the camera 204. The processor 206 may be configured to interact with and control operations of the display 202, the camera 204 and the I/O device 208, as well as other elements of the client device 200, for example, by executing software and/or algorithms stored in a storage device 210 and/or in a memory 212, as appropriate or desired. The processor 206 may respond to user input via a user interface 214 to control various functions. Alternatively or additionally, the user interface 214 may be configured to directly control various elements of the client device 200, as appropriate or desired.

The I/O device 208 may comprise a wired interface or port and/or a wireless interface or card. As such, the I/O device 208 may be configured to transmit and receive data wirelessly or via a wired connection, as further discussed herein. In particular, the I/O device 208 may be configured to receive presentation data and/or camera data from the projection system 100, which may be stored in the storage device 210 to be accessed later by the processor 206 and displayed to the user via the display 202. The presentation data and/or camera data may also be temporarily stored in the memory 212 as it is received and then displayed via the display 202, or may be fed directly to the display 202, as appropriate or desired. Also, the I/O device 208 may be configured to transmit presentation data, camera data, gesture data, or any other sensor/input data from the client device 200 to the projection system 100, as described herein. In general, the presentation data may be streamed to the projection system 100 from the client device 200 and/or downloaded and stored at the projection system 100 for later use. The projection system 100 may then transmit, either by streaming or downloading, the presentation data to client devices for display/viewing ay the client devices. This would allow a "low-powered" client device, such as a cell phone, to send the presentation data to the projection system, and have the projection system run the presentation with the and/or other client devices receiving the presentation data from the projection system.

The camera 204 may be configured to capture image data, particularly of the user of the client device 200, for example, when the user of the client device 200 is the presenter. Also, the user interface 214 and/or the display 202 may also be configured to receive client input for generating corresponding client input data. As discussed herein, the display 202 may be a touchscreen configured to allow the user to add a marker, to highlight or to otherwise indicate a particular item of interest in the presentation being displayed. Alternatively or additionally, the user interface 214 may be a keyboard, a mouse, a trackball, etc. that facilitate various input. It should be understood that the various types of input, such as touch, multi-touch, click, multi-click, gesture, etc., are possible and contemplated, and not limited to those described herein.

The image data captured by the camera 204 or camera data may be transmitted to the projection system 100 via the I/O device 208 to be overlaid and projected with the presentation data by the projector 102 of the projection system 100. Similarly, the camera data and/or the client input data may be transmitted to the projection system 100 via the I/O device 208 to be overlaid and projected with the presentation data by the projector 102 of the projection system 100. Alternatively, such data may be overlaid with the presentation data by the processor 206 at the client device 200, and transmitted together to the projection system 100 to be projected by the projector 102 as presentation data, as discussed above. This may depend, for example, on the relative processing capabilities of the processors 106 and 206, as well as the data transmission speed that is available.

The client device 200 may also include an audio input 216 and an audio output 218 to receive and broadcast audio data, respectively. For example, the audio input 216 may comprise a microphone and may be configured to receive audio data from the user of the client device 200, that is, the user speaking. The audio output 218 may comprise a speaker and may be configured to output audio data received from the projection system 100, as well as any audio data that may be received from other client devices.

Figure 3:
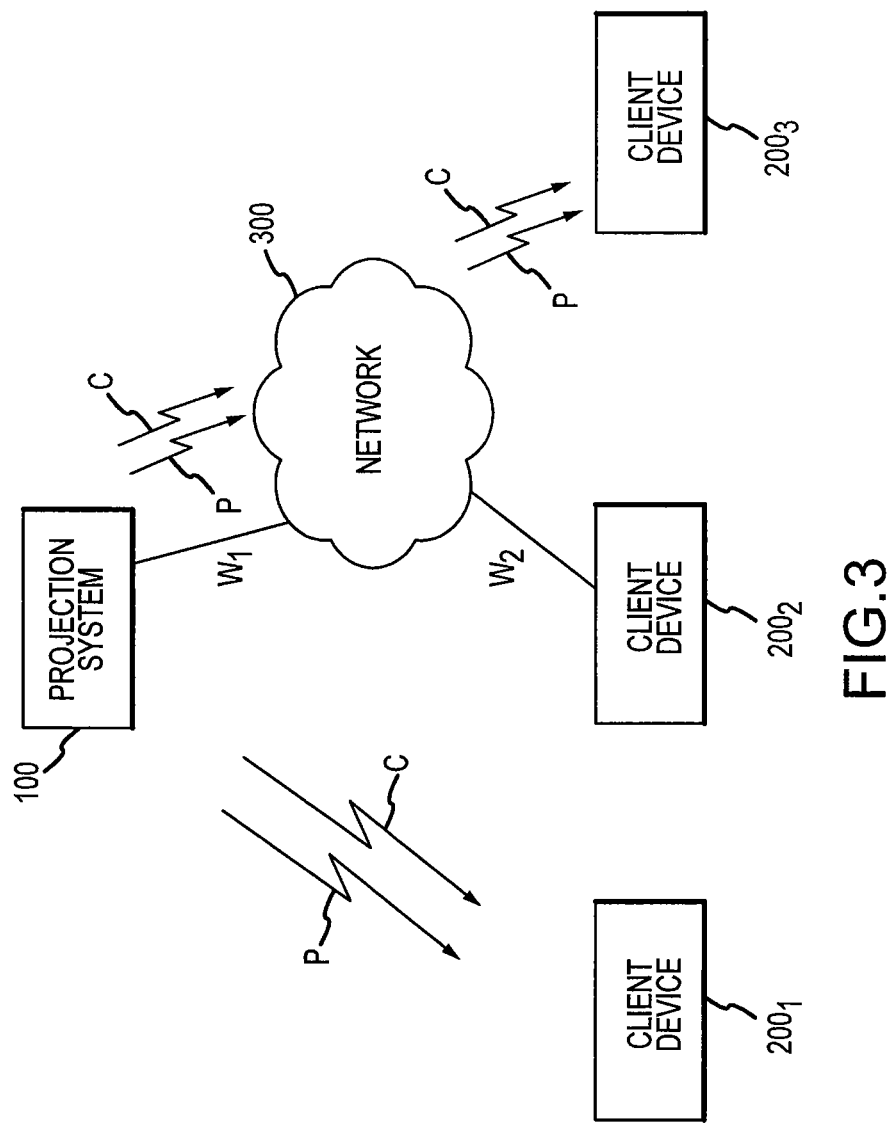
FIG. 3 is a block diagram illustrating an example of communication between the projection system of FIG. 1 and a plurality of the client devices of FIG. 2.

As will be understood from the foregoing, the projection system 100 may be configured to communicate with one or more client devices 200. FIG. 3 is a block diagram illustrating an example of communication between the projection system 100 of FIG. 1 and a plurality of the client devices 200 of FIG. 2. It should be understood that FIG. 3 is schematic and intended only to provide a general understanding of possible data flow, rather than being exhaustive of possible implementations.

FIG. 3 illustrates possible communication paths by which the projection system 100 may transmit projection data P and camera data C to each of the client devices $200_1$, $200_2$, $200_3$. For example, the projection data P and the camera data C are illustrated as being wirelessly transmitted directly to the client device $200_1$. This may be possible, for example, when the client device $200_1$, is not in the same room as the projection system 100 or does not have a line of sight to the image projected by the projector of the projection system 100, but is within a relatively short range for wireless communication modes, such as radio frequency (RF) or the like. In some cases, the projection system 100 may include a wireless router and act as a hub. In general, as illustrated in FIG. 3, any suitable manner of communications between the projection system 100 and the client devices $200_1$, $200_2$, $200_3$ may be employed.

The projection data P and the camera data C are illustrated as being transmitted to the client devices $200_2$ and $200_3$ via a network 300. The network may be any suitable network, such as the internet, a cellular network, a local area network (LAN), etc., that facilitates communications between remote devices. As illustrated, the projection system 100 and the client device $200_2$ may communicate with the network 300 via wired connections $W_1$ and $W_2$, respectively. Alternatively, the projection system 100 and the client device $200_3$ may communicate with the network 300 wirelessly. Of course, any combination of wired and wireless communication with the network 300 is possible as well.

Figure 4:
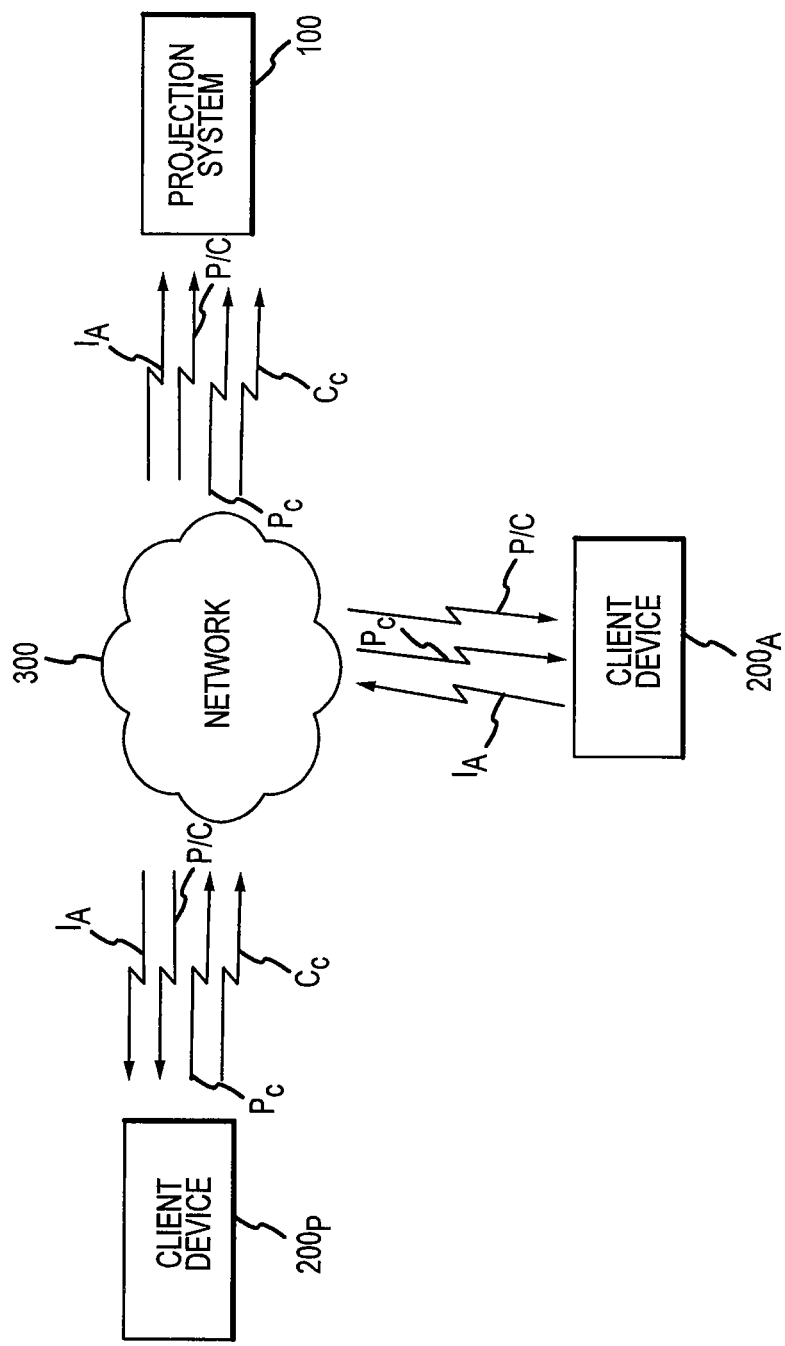
FIG. 4 is a block diagram illustrating another example of communication between the projection system of FIG. 1 and a plurality of the client devices of FIG. 2.

In the example of communication shown in FIG. 3, the projection system 100 operates as the source of the presentation data P for all of the client devices $200_1$, $200_2$, $200_3$. As discussed above, it is possible for a client device 200 to provide presentation data and other data to the projection system 100 to be projected by the projector 102, as well as to be transmitted to other client devices 200 as presentation data and/or camera data as captured by the camera of the projection system 100. FIG. 4 is a block diagram illustrating such an example of communication between the projection system 100, a presenter client device $200_P$ and an audience client device $200_A$.

The presenter client device $200_P$ may transmit presentation data $P_C$ to the projection system 100 via the network 300. As discussed above, either separately or together with the presentation data $P_C$ (e.g., overlaid), the presenter client device $200_P$ may transmit camera data $C_C$ to the projection system 100 via the network 300. For the sake of simplicity, client input data by the presenter client device $200_P$ is not shown. However, it should be understood that client input data from the presenter client device $200_P$ may be handled similar to the camera data $C_C$. As discussed above, once received by the projection system 100, the presentation data $P_C$ with the camera data $C_C$ overlaid may be projected by the projector (not shown) of the projection system 100 and captured by the camera (not shown) of the projection system 100.

The presentation data $P_C$ with the camera data $C_C$ thus forms presentation data P that is projected by the projector of the projection system 100. The presentation data P and camera data C, as captured by the camera of the projection system 100, may then be transmitted via the network 300 to the audience client device $200_A$. The presentation data $P_C$ received by the projection system 100 may also be transmitted to the audience client device $200_A$, as appropriate or desired. Although shown as a single transmission in FIG. 4 for simplicity, it should be understood that the projection system 100 may separately transmit the presentation data P and/or the camera data C via the network 300 to client devices as the client devices dictate, for example, by requesting either the presentation data P or the camera data C. In this manner, the user of the presenter client device $200_P$ may make a presentation remotely, both to an audience at the projection system 100 and to the user of the audience client device $200_A$.

Optionally, the presentation data P and/or the camera data C may be transmitted from the projection system 100 to the presenter client device $200_P$ for display to allow the user of the presenter client device $200_P$ to observe the result of his interaction with the presentation data $P_C$. This may not be necessary, however, because the presenter client device $200_P$ has the presentation data $P_C$ and the camera data $C_C$ available for display without transmission. Thus, as long as the presenter client device $200_P$ has sufficient processing capability to overlay the camera data $C_C$ on the presentation data $P_C$, the user of the presenter client device $200_P$ may see the result without transmission from the projection system 100. However, it may be desirable for the user of the presenter client device $200_P$ to observe the camera data C from the projection system 100 to know what the audience client device $200_A$ may have selected to watch.

Finally, a possible communication from the audience client device $200_A$ is illustrated in FIG. 4. The audience client device $200_A$ may be allowed to participate in the presentation, for example, by providing audio input, such as comments or questions, and/or by providing other input, such as a marker, highlighting, etc. In any case, such input data $I_A$ may be transmitted from the audience client device $200_A$ to the projection system 100. Audio input data may be broadcast via the audio output of the presentation system, discussed above, whereas other input data may be overlaid on the presentation data P and projected at the projection system 100. The input data $I_A$ may be transmitted from the audience client device $200_A$ to the presenter client device $200_P$ or from the projection system 100 to the presenter client device $200_P$, as appropriate or desired. In this manner, the user of the audience client device $200_A$ may participate or interact with the presentation remotely.

It should be understood that any suitable communication protocol may be used for facilitating connections between client devices and presentation systems. For example, a service discovery protocol, such as Bonjour from Apple Inc., may be used. It should be understood that any suitable implementation of Zeroconf or zero configuration networking may be used.

Figure 5:
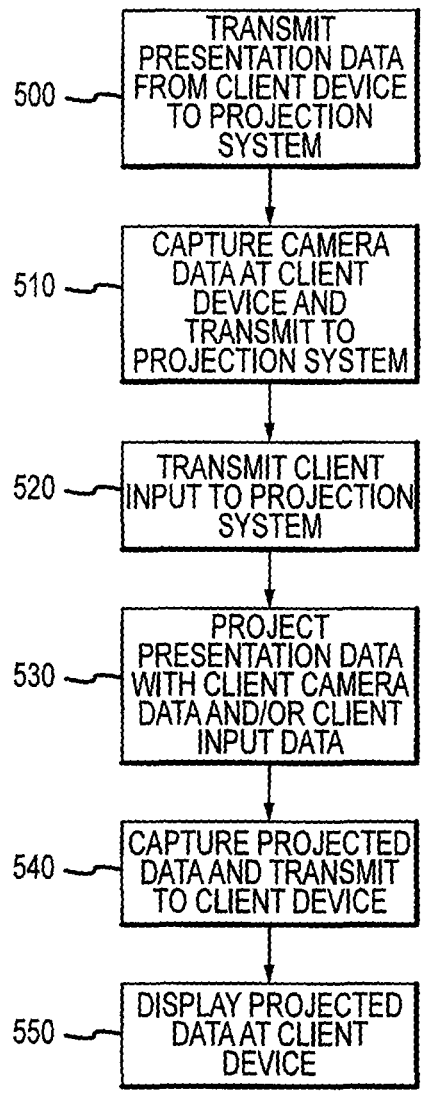
FIG. 5 is a flowchart illustrating an example of a method of remotely interacting with a projection system using a client device.

In view of the foregoing, it will be understood that the communications between the projection system 100, the presenter client device $200_P$ and the audience client device $200_A$ as illustrated in FIG. 4 may be performed, for example, as illustrated in the flowchart of FIG. 5. Such communication may generally provide a method of remotely interacting with a projection system using a client device.

Control may begin in operation 500, where presentation data may be transmitted from a client device to a projection system. It should be understood that presentation data may be provided from another source, such as a storage medium that is provided to the projection system. Next, in operation 510, camera data may be captured at the client device using a camera associated with the client device, and then transmitted to the projection system. Further, in operation 520, client input (that is, input received by the client device) may be transmitted to the projection system.

It should be understood that operations 510 and 520 are optional. It should also be understood that the presentation data, the camera data and/or the client input data may be transmitted separately or together. Depending on the processing capabilities of the client device, for example, the client device may be capable of combining the camera data and/or the client input data with the presentation data prior to transmission to the projection system. However, the client device may not have sufficient processing capabilities and/or sufficient power to combine the camera data and/or the client input data with the presentation data. Thus, the projection system may provide the necessary processing of the camera data and/or the client input data with the presentation data, such as overlaying the camera data and/or the client input data on the presentation data.

Thus, in some embodiments, a determination may be made as to whether the client device or the projection system is more suited to perform the processing. Such determination may be made based on the processing to be performed, as well as the relative processing capabilities and/or power availability of the client device and the projection system. Software, such as an algorithm, may be provided at the projection system and/or the client device to analyze CPU usage, available memory or other metrics. Alternatively, software for the client device may be preset with appropriate "flags" for transferring processing responsibility, for example, based on testing or on actual usage.

Control may continue to operation 530, where the presentation data with the camera data and/or the client input data is projected. For example, as discussed above, the camera data and/or the client input data may be combined with the presentation data by overlaying the camera data and/or the client input data on the presentation data. This may be performed in any suitable manner, such as using technologies such as CoreImageNideo Filters from Apple Inc., as illustrated at "media.arstechnica.com/news.media/wwdc-ichat.jpg" and/or CIAdditionCompositing Filter, "developer.apple.com/documentation/GraphicsImaging/Reference/CoreImageFilterReference/Reference/re ference.html#/apple_ref/doc/uid/TP30000136-DontLinkElementID_24". The presentation may appear as a background with an image of the presenter (from client camera data) being movable around or even off the presentation.

Alternatively, presentation data may be provided in one section (e.g., window) of a display and raw camera data may be provided in another section of the display, as illustrated at "developer.apple.com/leopard/overview/ images/ichat_theaterscreenshot.jpg".

For other client input data, a touch device, such as a touch screen, may allow a user of a client device to press a finger on the presentation as displayed, and a corresponding marker/indicator may be added to appear in the presentation. Removal of the finger may cause the marker/indicator to gradually fade. Two fingers may provide an input to create a permanent marker/indicator. Further, various gestures may be used to generate suitable input. It should be understood that these are only examples, and such may be extended to mouse controls (left/right clicking/holding, scrolling, gesturing).

Optionally, in operation 540, the data projected in operation 530 may be captured by the camera of the projection system and transmitted to the client device. Then, in operation 550, the data projected in operation 530 may be displayed at the client device. Alternatively, when the presentation data is combined with the camera data and/or the client input data at the projection system, the combined data may be transmitted from the projection system to the client device without being projected and captured. Similarly, when the presentation data is combined with the camera data and/or the client input data at the client device, the combined data may be displayed at the client device without being projected, captured and retransmitted. As a further alternative, the data may be combined at the projection system, but may be displayed synchronously at the client device, again without being projected, captured and retransmitted.

It should be understood that the client input data may be from the client device that originated the presentation data and/or from another client device authorized to add content to the presentation. For example, one or more client devices may be designated or authorized to submit camera data for combination with the presentation data. Similarly, one or more client devices may also be designated or authorized to submit client input data for combination with the presentation data. Other client device(s) may not be designated or authorized to submit camera data, but may be designated or authorized to submit client input data, for example, to participate with the presenter and/or the audience of the presentation as the presentation progresses. Further, the type and/or timing of client input may be restricted, for example, to allow only audio input from the other client device(s) and/or to allow client input only during designated intervals of the presentation, such as question and comment sessions or discussion breaks.

Figure 6A:
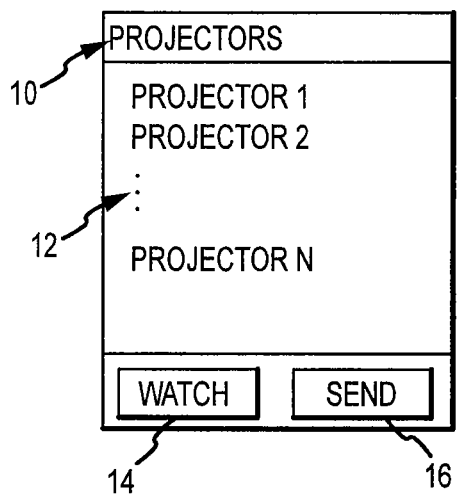
FIGS. 6A-C are examples of screenshots that may be presented on the client device of FIG. 2.
Figure 6B:
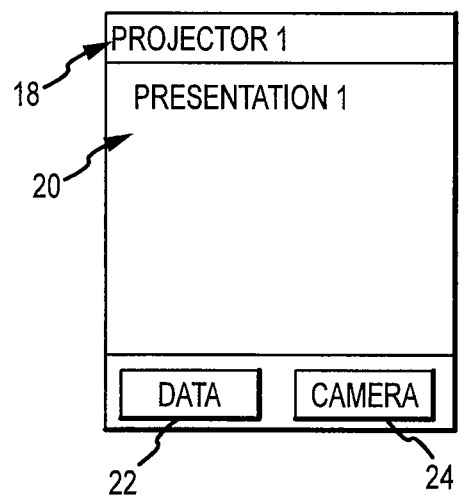
Figure 6C:
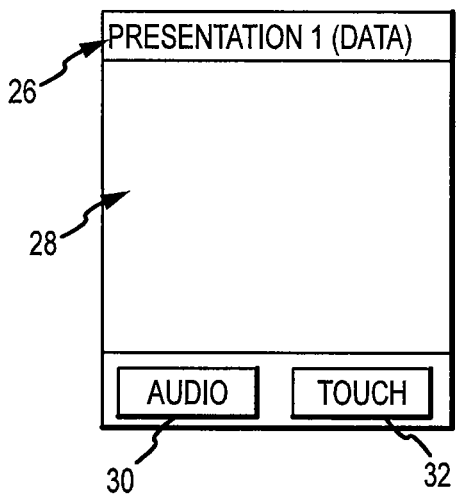

FIGS. 6A-C are examples of screenshots that may be presented on the client device of FIG. 2. As illustrated in FIG. 6A, the client device may be provided with objects such as icons that represent various selections for user input. It should be understood that the icons shown are only examples and that any suitable icons may be provided, for example, depending on available functionality. For example, a header 10 may indicate the nature of the screen and/or icons being displayed. In FIG. 6A, the header 10 reads "PROJECTORS" and it follows that a list of projectors 12, a "WATCH" icon 14 and a "SEND" icon 16 are provided. The user may select a projector from the list of projectors 12 to identify a remote projection system with which the user wishes to interact. The list of projectors 12 may be generated in any suitable manner, for example, using zero configuration networking solutions, such as Bonjour from Apple Inc.

The list of projectors 12 may include only projectors that are available for use, for example, including presentation data that may be viewed by the client device or configured to receive presentation data from the client device. Alternatively, the list of projectors 12 include all projectors with some indication regarding active (including presentation data for viewing), available (ready to receive presentation data) and unavailable (not accessible to the client device).

The user may be able to select either the "WATCH" icon 14 or the "SEND" icon 16 to change the list of projectors 12 to include only those projectors capable and/or available for that function. Then the user may select one of the desired projectors from the updated list. Alternatively, the user may select one of the projectors in the list of projectors 12, with a corresponding one of the "WATCH" icon 14 or the "SEND" icon 16 being available for selection for the selected projector.

FIG. 6B illustrates a screenshot that may be presented based on selection of "PROJECTOR 1", as identified in the header 18, and the "WATCH" icon in FIG. 5A. Although not discussed herein, it should be understood that selection of a projector and the "SEND" icon 16 may result in one or more screens that are configured to facilitate input of presentation data, camera data and other client input data, and transmission of such data to the selected projector, as well as any overlay that is performed at the client device. By selecting the "WATCH" icon, the user may be presented with a screen that includes a list 20 of content of the presentation for the selected projector. Such content may include a title, an abstract, a presenter or any other information regarding the presentation. The user may also be presented with a "DATA" icon 22 and a "CAMERA" icon 24 to allow the user to select between watching the raw presentation data and the camera data (projected presentation data and visual cues within camera field of view) from the projection system corresponding to the selected projector.

FIG. 6C illustrates a screenshot that may be presented based on selection of the "DATA" icon, as identified in the header 26. Although not discussed herein, it should be understood that selection of the "CAMERA" icon may result in a similar screenshot with a different header. The user may be presented with the presentation data as it transpires in area 28. The user may also be presented with an "AUDIO" icon 30 and a "TOUCH" icon 32 to allow the user to select a mode of interacting with the presentation as it transpires. For example, selecting the "AUDIO" icon 30 may allow the user to speak to the presenter and other audience members. Selecting the "TOUCH" icon 32 may allow the user to touch the area 28 at a point of interest to add a marker or highlight. In either case, the client input data (audio, touch, etc.) may be transmitted to the projection system to be heard/seen by the presenter and other audience members.

Figure 7:
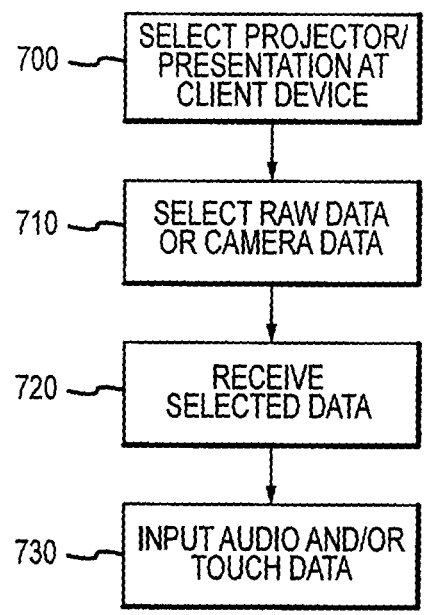
FIG. 7 is a flowchart illustrating another example of a method of remotely interacting with a projection system using a client device.

FIG. 7 is a flowchart illustrating another example of a method of remotely interacting with a projection system using a client device, which may correspond to the screenshots illustrated in FIGS. 6A-C. Corresponding to FIG. 6A, control may begin at operation 700, where a user may select a projector and/or a presentation using the client device. Once a projector/presentation is selected, in operation 710 the user may select either raw presentation data or camera data to view at the client device, as represented in FIG. 6B. It should be understood that the raw presentation data may or may not include client camera data and/or client input data received by the projection system from one or more client devices. In general, all of the various data may be made available to the client devices.

Once the presentation begins, the selected data may be received and displayed at the client device in operation 720. During the presentation, in operation 730 the user may be allowed to input data, such as audio and/or touch data as represented in FIG. 6C, fro example, to participate with the presenter and/or other viewers of the presentation. As discussed above, the ability of the particular client device may be limited or restricted, for example, to facilitate progression of the presentation and/or to avoid unwanted input.

Figure 8:
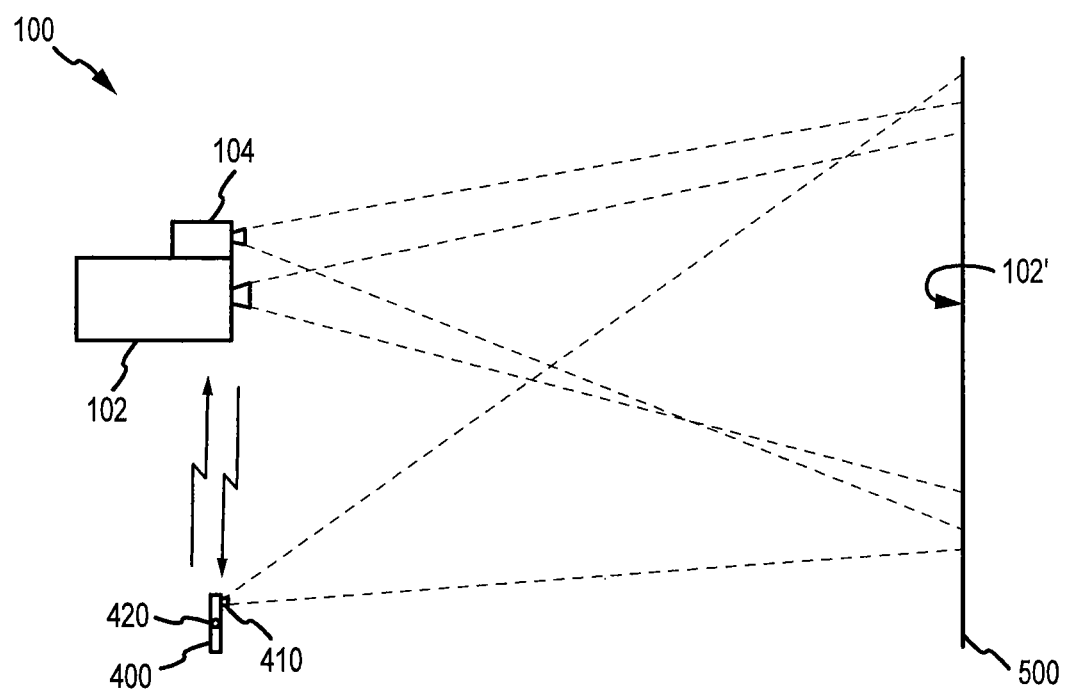
FIG. 8 is a schematic diagram illustrating an example of auxiliary calibration of the projection system of FIG. 1 using a remote device.

FIG. 8 is a schematic diagram illustrating an example of auxiliary calibration of the projection system 100 of FIG. 1 using an auxiliary device 400. The auxiliary device 400 may be any suitable device including a camera 410 and capable of communicating with the projection system 100. For example, the auxiliary device 400 may be a remote controller for controlling various functions of the projection system 100, or may be a client device as described herein.

As shown, the projector 102 of the projection system 100 may be configured to project a calibration pattern image 102' onto a surface or screen 500. The camera 104 may be configured to capture an image of an area larger than and including the projected calibration image 102'. As discussed above, such an arrangement may be used to calibrate the projection system 100 using known techniques or those described in incorporated application Ser. No. 12/206,554.

As discussed above, calibration of the projection system 100 using the auxiliary device 400 may allow the projection system to be calibrated for viewing from a desired location or perspective. This may be desirable, for example, to allow more flexibility in placement of the projector system and/or location of the surface/screen 500 for projection.

Figure 9:
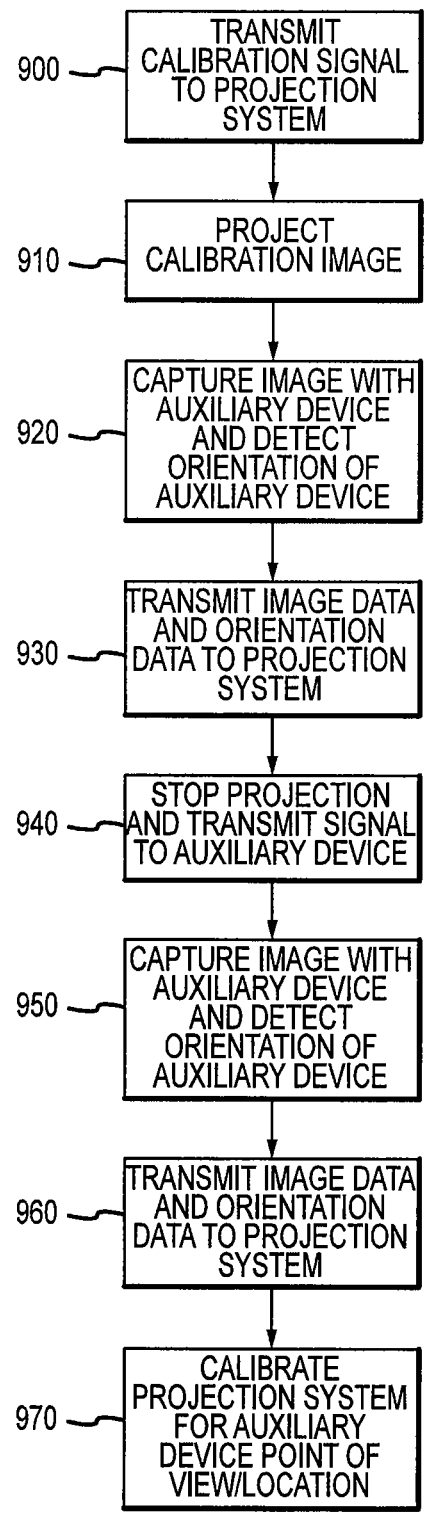
FIG. 9 is a flowchart illustrating an example of a method of calibrating a projection system using an auxiliary (client) device.

The auxiliary calibration process may be performed, for example, as illustrated in the flowchart of FIG. 9. However, it should be understood that other methods involving calibration of a projection system using an auxiliary device including a camera and/or other sensor are contemplated, and specifically not excluded hereby. Control may begin in operation 900, where a calibration signal may be transmitted to the projection system 100 from the auxiliary device 400. Alternatively, the calibration process may be initiated at the projection system 100. However, as the remote calibration will calibrate for a particular location at which the auxiliary device 400 is located, it may be more desirable to position the auxiliary device 400 as desired and then initiate the calibration process without needing to access the projection system 100 directly.

Upon receipt of the calibration signal, in operation 910, the projection system 100 may cause the projector 102 to project the calibration image 102' onto the surface or screen 500. Next, in operation 920, the camera 410 of the auxiliary device 400 may capture one or more images of the calibration image 102'. Also in operation 920, a current orientation of the auxiliary device 400 during image capture may be detected, for example, using an accelerometer 420 in the auxiliary device 400. The result of operation 920 is thus image data and corresponding orientation data for each image captured. The image data and corresponding orientation data is transmitted, for example, wirelessly, to the projection system 100 in operation 930.

Upon receipt of the image and orientation data from the auxiliary device 400, for example, a predetermined number of data sets as appropriate or desired for the calibration algorithms being employed, the projection system 100 may cause the projector to stop projecting the calibration image 102' in operation 940. Also in operation 940, the projection system 100 may transmit a signal to the auxiliary device 400 to capture additional images of the surface or screen 500 without the calibration image 102' projected thereon.

Thus, in operation 950, one or more images without the calibration image 102' may be captured with the camera 410 of the auxiliary device 400. Again, corresponding orientation data may be determined for each image capture by detecting the current orientation of the auxiliary device 400 during each image capture. Then, in operation 960, the image and orientation data set or sets for images without the calibration image 102' may be transmitted to the projection system 100. Finally, in operation 970, employing known calibration techniques and/or those described in incorporated application Ser. No. 12/206,554, the data transmitted from the auxiliary device 400 in operations 930 and 960 may be used to calibrate the projection system 100 for the perspective or point of view of the auxiliary device 400, i.e., for the location at which the image data and orientation data was generated.

It should be understood that the projection system 100 may be configured to provide calibration, such as keystoning, relative to the projection surface 500. Alternatively or additionally, the projection system 100 may be configured to provide keystoning via the auxiliary device 400. As described above, the auxiliary calibration may be provided to the point of view of the auxiliary device 400. Such calibration may be performed by transmitting sensor data from the auxiliary device 400 as it is positioned/moved, for example, by having the user hold a button until the auxiliary device is located as desired (or located such that the projected image is as desired). Upon release of the button, further calibration such as color calibration may be performed, either using sensor data from the auxiliary device or sensor data from sensors at the projection system.

The foregoing merely illustrates certain principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles disclosed in this document and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. A method for calibrating a projection system, comprising:
   projecting an image using the projection system;
   obtaining sensor data of the projected image using an auxiliary device;
   obtaining orientation data for the auxiliary device;
   transmitting the sensor data and the orientation data from the auxiliary device to the projection system; and
   calibrating the projection system based at least in part on the sensor data and the orientation data from the auxiliary device.

2. The method of claim 1, wherein:
   obtaining sensor data of the projected image using the auxiliary device is from a particular location; and
   calibrating the projection system based at least in part on the sensor data from the auxiliary device calibrates the projection system to project an image that is adjusted for the particular location.

3. The method of claim 1, wherein obtaining sensor data comprises obtaining distance data.

4. The method of claim 3, wherein obtaining distance data comprises obtaining distances from the auxiliary device to a plurality of points of the projected image.

5. The method of claim 1, wherein obtaining sensor data comprises obtaining position data of the auxiliary device.

6. The method of claim 5, wherein obtaining position data of the auxiliary device is relative to the projected image.

7. The method of claim 1, wherein obtaining sensor data comprises capturing an image of at least the projected image.

8. The method of claim 7, wherein capturing an image of at least the projected image comprises capturing an image of an area larger than the projected image.

9. A system for calibrating a projection system, comprising:
   a projection system configured to project an image; and
   an auxiliary device configured to obtain sensor data of the image projected by the projection system, generate orientation data describing an orientation of the auxiliary device relative to the projected image, and to transmit the sensor data and its orientation data to the projection system;
   wherein the projection system is configured to calibrate based at least in part on the sensor data received from the auxiliary device.

10. The system of claim 9, wherein the projection system is configured to calibrate itself to project an image that is adjusted for a particular location from which the auxiliary device obtains the sensor data.

11. The system of claim 9, wherein the auxiliary device includes at least one depth sensor.

12. The system of claim 9, wherein the auxiliary device includes at least one position sensor.

13. The system of claim 9, wherein the auxiliary device includes at least one orientation sensor.

14. The system of claim 9, wherein the auxiliary device includes at least one image sensor.

15. The system of claim 14, wherein the auxiliary device includes a camera.

16. A projection system, comprising:
   a projector configured to project an image based on presentation data; and
   at least one sensor configured to capture sensor data of the image projected by the projector;
   wherein the projection system is configured to transmit the presentation data and the sensor data to at least one remote client device.

17. The projection system of claim 16, wherein the at least one sensor comprises a camera configured to capture the image projected by the projector as camera data and wherein the projection system is configured to transmit the presentation data and the camera data to at least one remote client device.

18. A projection method, comprising:
   projecting an image based on presentation data using a projector;
   capturing sensor data of the image projected by the projector using at least one sensor;
   transmitting the presentation data to at least one remote client device; and
   transmitting the sensor data to the at least one remote client device.

19. The method of claim 18, wherein capturing sensor data comprises capturing an image of the image projected by the projector as camera data and transmitting the sensor data comprises transmitting the camera data to at least one remote client device.

20. A projection method, comprising:
- receiving presentation data from a remote client device;
- receiving sensor data from a remote client device; and
- projecting an image using a projector based on the presentation data and the sensor data; wherein
- the sensor data includes at least one of camera data or gesture data.

21. The method of claim 20, wherein the presentation data and the sensor data are received from a same remote client device.

22. The method of claim 20, wherein receiving sensor data comprises receiving camera data.

23. The method of claim 20, wherein receiving sensor data comprises receiving gesture data.

24. A method for controlling audio associated with presentation data, the method comprising:
- transmitting presentation data and audio data associated with the presentation data from a projection system at a location to at least one client device;
- generating audible output of the audio data associated with the presentation data from the projector system at the location; and
- controlling output of the audio data associated with the presentation data by the at least one client device based on a location of the client device relative to the location of the projection system.

25. The method of claim 24, wherein controlling the output of the audio data associated with the presentation data by the at least one client device is performed at least in part by the client device.

26. The method of claim 25, further comprising:
- detecting the audible output of the audio data by the projector system at the at least one client device; and
- disabling the output of the audio data by the client device when the audible output of the audio data by the projector system is detected.

27. The method of claim 25, further comprising:
- monitoring for the audible output of the audio data by the projector system at the at least one client device; and
- enabling the output of the audio data by the client device when the audible output of the audio data by the projector system is not detected.

28. The method of claim 24, wherein controlling the output of the audio data associated with the presentation data by the at least one client device is performed at least in part by the projector system.

29. The method of claim 28, further comprising:
- determining a number of hops required for data transmission from the projector system to at the at least one client device; and
- disabling the output of the audio data by the client device based on the determined number of hops.

30. The method of claim 28, further comprising:
- determining a router used for data transmission from the projector system to at the at least one client device; and
- disabling the output of the audio data by the client device based on the determined router.

31. The method of claim 28, further comprising:
- determining a number of hops required for data transmission from the projector system to at the at least one client device; and
- enabling the output of the audio data by the client device based on the determined number of hops.

32. The method of claim 28, further comprising:
- determining a router used for data transmission from the projector system to at the at least one client device; and
- enabling the output of the audio data by the client device based on the determined router.

* * * * *